June 13, 1950     E. H. HOKE     2,511,798
EMBROIDERED LAMP SHADE
Filed Nov. 22, 1947
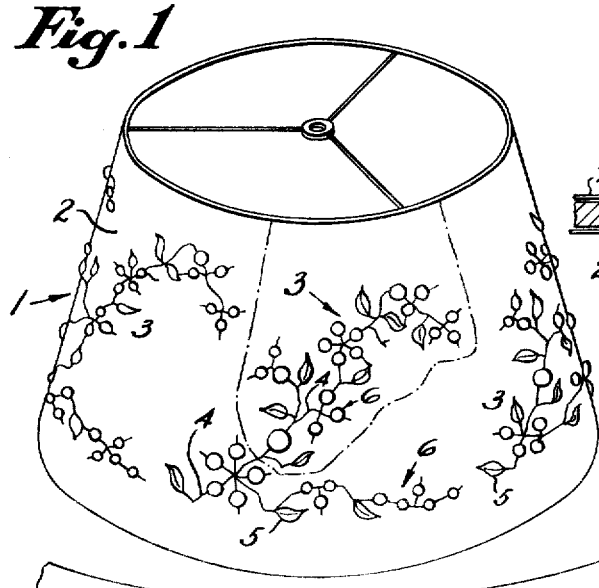
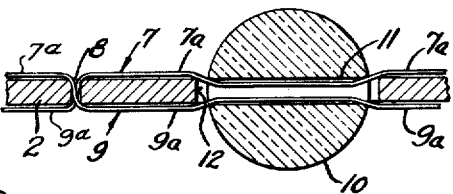
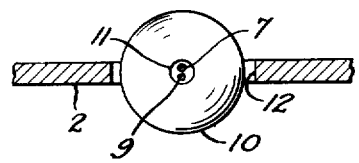
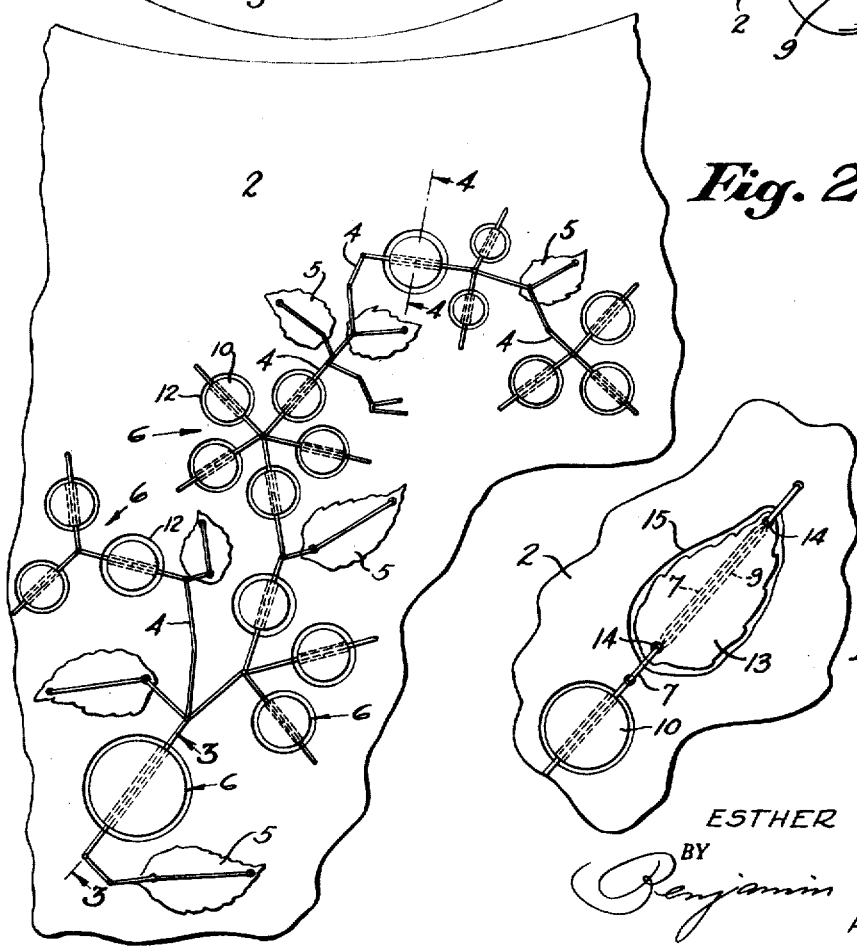
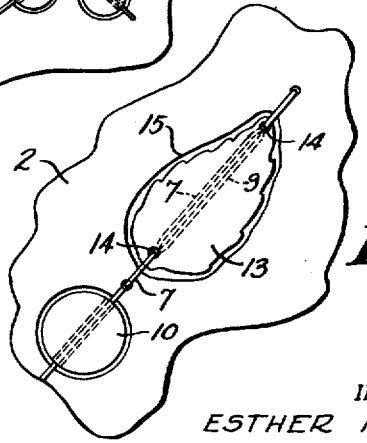
INVENTOR.
ESTHER H. HOKE
BY
ATTORNEY Patented June 13, 1950

2,511,798

UNITED STATES PATENT OFFICE 2,511,798

EMBROIDERED LAMP SHADE

Esther H. Hoke, New York, N. Y.

Application November 22, 1947, Serial No. 787,560

2 Claims. (Cl. 240—108)

This invention relates to lamp shades that are used in connection with such articles as electric floor lamps or table lamps. Such shades are often required to embody floral ornamentation, and it is the principal object of the invention to provide an improved lamp shade which is conveniently and economically manufacturable, saleable at low cost, and embodying efficient, firmly constructed, durable, and attractive floral embroidery.

Other objects and advantages will hereinafter appear.

In the accompanying drawings:

Fig. 1 is a perspective view of a lamp shade embodying the improvements of the invention.

Fig. 2 is a fragmentary view, in an enlarged scale, showing a portion of the wall of the lamp shade illustrated in Fig. 1.

Fig. 3 is a cross-sectional elevational view, in a still further enlarged scale, taken on line 3—3 of Fig. 2.

Fig. 4 is a view similar to Fig. 3, but taken on line 4—4 in Fig. 2.

Fig. 5 is an elevational fragmentary view, showing a modification of the invention.

The lamp shade 1, Fig. 1 embodies in its wall 2 an organized floral embroidered decoration 3, comprising floral branches 4 with such floral elements as leaves 5 and fruits 6, Fig. 2. The representation of the floral branches 4 consists of a thread 7 being stitched over the wall 2 and through punctures 8 therethrough, and a thread 9 being similarly counterstitched through the same punctures, as shown in Fig. 3, the successive seams 7a, 9a forming a continuity upon the exterior of the wall 2 representative of the configuration of a floral branch 4. The representation of the fruit 6 consists of a spherical translucent body 10, of glass or suitable plastic, having a bore 11 therethrough, and it is embodied in appropriate location in the decoration 3 by the wall 2 being thereat provided with a registering hole 12 for its reception and the threads 7, 9 of the branch 4 passing through the bore 11, as shown in Figs. 3, 4. As shown in Fig. 2, the leaves 5 or kindred floral elements may be produced by embroidering or any other suitable means.

In the modification shown in Fig. 5, the representation of the floral leaf 5 consists of a translucent body 13 having apertures 14 at its ends, and it is embodied in requisite location in the decoration 3 by the wall 2 being provided with a registering opening 15 for its reception and the threads 7, 9 of the branch 4 passing rearwardly of the body 13 and through its apertures 14, as shown.

It will be evident that the lamp shade 1, as equipped with the hereinabove improvements will embody floral elements 13, 6 possessed of light penetrative solid bodies, which will accentuate their effect in the decoration 3, and impart inherent general attractiveness to the shade.

Variations may be resorted to within the scope of the invention.

Having thus described my invention, I claim:

1. A lamp shade having thereon floral embroidery representative of branches, leaves, and fruits embodying threads stitched thereto to represent said floral branches, said embroidery having members representing said floral leaves, each of said leaves having a transverse perforation at each end thereof, the shade having through openings configurated to register with said leaves for reception of said leaves, and said thread branches passing through said perforations to maintain said leaves in position in said openings.

2. A lamp shade embodying floral embroidery decoration representative of branches, leaves, and fruits, comprising threads stitched thereto to represent said floral branches, said embroidery having translucent bodies configurated to represent said fruits, said fruits having bores therethrough, the shade having through holes for reception of said fruits, said thread branches passing through said bores to maintain said fruits in position in said holes, said embroidery having members representing said floral leaves, each of said leaves having a transverse perforation at each end thereof, the shade having through openings configurated to register with said leaves for the reception of said leaves, and said thread branches passing through said perforations to maintain said leaves in position in said openings.

ESTHER H. HOKE.

REFERENCES CITED

The following references are of record in the file of this patent:

UNITED STATES PATENTS

| Number | Name | Date |
| --- | --- | --- |
| 1,769,000 | Smith | July 1, 1930 |

FOREIGN PATENTS

| Number | Country | Date |
| --- | --- | --- |
| 720,393 | France | 1931 |